United States Patent [19]

Dreyfuss

[11] 3,969,495

[45] July 13, 1976

[54] THERMOCHEMICAL PRODUCTION OF HYDROGEN

[75] Inventor: Robert M. Dreyfuss, Mount Vernon, N.Y.

[73] Assignee: The United States of America as represented by the United States Energy Research and Development Administration, Washington, D.C.

[22] Filed: June 26, 1975

[21] Appl. No.: 590,749

[52] U.S. Cl.............................. 423/648; 423/501; 423/510; 423/544; 423/522
[51] Int. Cl.² ............................................ C01B 1/03
[58] Field of Search ........... 423/509, 510, 648, 544, 423/508

[56] References Cited
UNITED STATES PATENTS

| | | | |
|---|---|---|---|
| 2,818,391 | 12/1957 | Crosby............................ | 423/509 X |
| 3,928,549 | 12/1975 | Krikorian........................... | 423/648 |

OTHER PUBLICATIONS

"Comprehensive Inorganic Chemistry", J.C. Bailar, Jr. et al., Eds., vol. 2, 1973, pp. 869, 952 & vol. 3, p. 240, Pergamon Press, Oxford.

"A Comp. Treatise on Inorganic and Theoretical Chemistry", J.W. Mellor, 1930 Ed., vol. 10, pp. 758, 759, Longmans, Green & Co., N.Y.

*Primary Examiner*—Edward Stern
*Attorney, Agent, or Firm*—Dean E. Carlson; F. A. Robertson; Irene S. Croft

[57] ABSTRACT

A thermochemical reaction cycle for the generation of hydrogen from water comprising the following sequence of reactions wherein M represents a metal and Z represents a metalloid selected from the arsenic-antimony-bismuth and selenium-tellurium subgroups of the periodic system:

$$2MO + Z + SO_2 \rightarrow MZ + MSO_4 \quad (1)$$

$$MZ + H_2SO_4 \rightarrow MSO_4 + H_2Z \quad (2)$$

$$2MSO_4 \rightarrow 2MO + SO_2 + SO_3 + 1/2O_2 \quad (3)$$

$$H_2Z \rightarrow Z + H_2 \quad (4)$$

$$H_2O + SO_3 \rightarrow H_2SO_4 \quad (5)$$

The net reaction is the decomposition of water into hydrogen and oxygen.

7 Claims, No Drawings

THERMOCHEMICAL PRODUCTION OF HYDROGEN

BACKGROUND OF THE INVENTION

The invention described herein was made in the course of, or under, Energy Research and Development Administration Contract No. W-7405-ENG-48 with University of California.

This invention relates to a thermochemical reaction cycle for the generation of hydrogen from water, more particularly, to a thermochemical reaction cycle utilizing, as an intermediate, a metalloidal element selected from the arsenic-antimony-bismuth and the selenium-tellurium subgroups of the periodic system.

The potential use of hydrogen as a non-polluting energy source is well known. However, for hydrogen ever to achieve large scale use, there must be large scale production. The main problem is finding thermodynamically efficient methods for producing cheap hydrogen. The most obvious method, electrolysis of water, is relatively inefficient when one considers that the method is primarily dependent upon and limited by the efficiency of generating the electrical energy for the electrolysis. Direct thermal cracking of gaseous water using nuclear heat has been virtually discarded for thermodynamic reasons. No appreciable yields are possible under 2500°C, and present conventional reactors are not able to provide such temperatures during normal operation.

Multistep processes for the production of hydrogen from water have been suggested. If suitable reagents for a sequence can be found, it is possible to minimize the work requirement and chemically produce hydrogen and oxygen from water without electrolysis. The difficulty is finding a suitable set of reagents.

One reaction sequence, based on calcium, bromine and mercury compounds, has recently been proposed for the production of hydrogen and oxygen from water at temperatures under 730°C. (See "Hydrogen Fuel Use Calls for New Source", *Chemical and Engineering News*, July 3, 1972, pp. 16-18.) The process consumes none of the materials required for the sequence; the net reaction is simply decomposition of water. However, one of the major problems associated with this reaction sequence is the formation of such compounds as HBr, the extremely corrosive effects of which at high temperatures and pressures are well known.

Another reaction sequence which utilizes, as an intermediate, a metalloidal element from Group V or Group VI of the periodic system and the compounds thereof is described in the copending application of Oscar H. Krikorian, Ser. No. 481,263, filed June 20, 1974, for "Thermochemical Production of Hydrogen" now U.S. Pat. No. 3,928,549 issued Dec. 23, 1975.

SUMMARY OF THE INVENTION

The present invention relates to a reaction cycle for the thermochemical production of hydrogen from water based on the use of a metalloidal element and compounds thereof as intermediates.

Certain elements of the periodic system, particularly from Groups V and VI, possess the characteristics of both metals and non-metals. Such elements, termed semi-metals or metalloids, are described in "The Metalloids", by Eugene G. Rochow, D. C. Heath and Co., 1966. (A list of those elements which can be considered to be metalloids is given on page 8 of the cited reference.) The terms "metalloid" and "metalloidal element" are used herein to refer to such elements. The present invention utilizes the metalloidal elements from Group V and Group VI, namely the elements of the arsenic-antimony-bismuth subgroup of Group V and of the selenium-tellurium subgroup of Group VI.

The present cycle is based on the reaction of a metal oxide with a metalloid and sulfur dioxide to produce the corresponding metal sulfate and an intermetallic compound of the corresponding metal and metalloid. It has been found that the presence of sulfur dioxide in the reaction of the metal oxide with the metalloid enables the reaction to proceed at a lower temperature with a more thermodynamically favorable outcome. The intermetallic product is then hydrolyzed with sulfuric acid to produce the corresponding metal sulfate and a hydrogen-metalloid compound which can readily be thermally decomposed to yield hydrogen and regenerate the metalloid. The product metal sulfate is then thermally decomposed to regenerate sulfur dioxide and the metal oxide and to produce oxygen and sulfur trioxide. The sulfur trioxide is then reacted with water to regenerate sulfuric acid. Thus, the net reaction is the decomposition of water into hydrogen and oxygen.

It is, therefore, among the objects of this invention to provide a thermochemical reaction cycle for the generation of hydrogen from water.

DETAILED DESCRIPTION OF THE INVENTION

Broadly, the process of the present invention can be represented by the following sequence of reactions wherein M represents a suitable metal and Z represents a metalloidal element as hereinbefore described:

$$2MO + Z + SO_2 \rightarrow MZ + MSO_4 \quad (1)$$

$$MZ + H_2SO_4 \rightarrow MSO_4 + H_2Z \quad (2)$$

$$2MSO_4 \rightarrow 2MO + SO_2 + SO_3 + 1/2 O_2 \quad (3)$$

$$H_2Z \rightarrow Z + H_2 \quad (4)$$

$$H_2O + SO_3 \rightarrow H_2SO_4 \quad (5)$$

The net reaction of the cycle is the decomposition of water into hydrogen and oxygen.

The preferred metalloid is selected from the selenium-tellurium subgroup of Group VI, most preferably selenium. The most suitable metal oxides are those which yield metal sulfates which decompose below 1000 K and which yields metal selenides which decompose in dilute sulfuric acid. The preferred metal oxides are the oxides of nickel, cobalt, iron, manganese, cadmium and zinc.

The process of the present invention is illustrated by the following sequence of reactions in which zinc oxide is the representative metal oxide and selenium is the representative metalloid.

EXAMPLE I

|  | $\Delta H°_{298}$(kJ/mol) |  |
| --- | --- | --- |
| $2ZnO + Se + SO_2 \rightarrow ZnSe + ZnSO_4$ (~773 K and 4 atm $SO_2$) | −149 | (6) |
| $ZnSe + H_2SO_4(aq) \rightarrow ZnSO_4 + H_2Se$ (1M $H_2SO_4$, < 373 K) | +102 | (7) |
| $2ZnSO_4 \rightarrow 2ZnO + SO_2 + SO_3 + 1/2 O_2$ (~ 1000 K) | +569 | (8) |
| $H_2Se \rightarrow Se + H_2$ (~473 K) | −30 | (9) |
| $H_2O + SO_3 \rightarrow H_2SO_4(aq)$ | −206 | (10) |
| $H_2O \rightarrow H_2 + 1/2 O_2$ | +286 | |

The reaction products obtained in the above cycle are readily separable on the basis of solubility, volatility, or diffusion rates. ZnSe is substantially insoluble in water whereas $ZnSO_4$ is water soluble; thus, ZnSe is easily separated from $ZnSO_4$. Hydrogen can be separated from selenium on the basis of differences in volatility, hydrogen being considerably more volatile than selenium at reaction temperature. $SO_2$, $SO_3$ and $O_2$ can be separated by gas chromatographic techniques familiar to those skilled in the art.

The heat efficiency for the above cycle, estimated as the ratio of water decomposition enthalpy (286 kJ/mol) to the enthalpy of the high temperature endothermic step, the zinc sulfate decomposition (569 kJ/mol), is 50%.

The following side reaction may occur at low temperatures, particularly at temperatures below about 773K:

$$4ZnO + 4SO_2 \rightarrow ZnS + 3ZnSO_4 \tag{11}$$

In order to avoid the above reaction, it is preferred to conduct reaction (6) at a temperature of about 773 K or above. If reaction (11) does occur to some extent, the products can be reintroduced in the cycle in the following manner:

$$ZnS + H_2SO_4 \rightarrow ZnSO_4 + H_2S \tag{12}$$

$$H_2S + 3/2\ O_2 \rightarrow H_2O + SO_2 \tag{13}$$

Alternatively, ZnS can be treated with $O_2$ to yield ZnO and $SO_2$. Thus, a competing side reaction can feasibly be integrated into the overall cycle.

Although ZnSe is shown only as an intermediate in the cycle, the compound is useful in its own right as a photoconductor. Thus, reaction (6) can afford an inexpensive and convenient method for preparing ZnSe.

EXAMPLE II

The following reaction sequence illustrates the use of cadmium oxide as the representative metal oxide.

The reaction of CdO with Se and $SO_2$ proceeds analogously to reaction (6) above:

$$2CdO + Se + SO_2 \rightarrow CdSe + CdSO_4 \tag{14}$$

CdSe hydrolyzes in 12M HCl, but not in $H_2SO_4$. Therefore, the hydrolysis of CdSe to form $CdSO_4$ is carried out by way of an intermediate hydrolysis step with HCl as follows:

$$CdSe + 2H^+ + 3Cl^- \rightarrow CdCl_3^{-1} + H_2Se \tag{15}$$

The $CdCl_3^{-1}$ solution from reaction (15) is subsequently treated with $H_2SO_4$ to regenerate the HCl and produce $CdSO_4$:

$$CdCl_3^{-1} + H_2SO_4 \rightarrow 2H^+ + 3Cl^- + CdSO_4 \tag{16}$$

The remainder of the cycle is analogous to reactions (8), (9), and (10) above:

$$2CdSO_4 \rightarrow 2CdO + SO_2 + SO_3 + 1/2O_2 \tag{17}$$

$$H_2Se \rightarrow Se + H_2 \tag{18}$$

$$H_2O + SO_3 \rightarrow H_2SO_4 \tag{19}$$

The net reaction is the decomposition of water into hydrogen and oxygen. The intermediate, cadmium selenide, is also useful as a photoconductor.

A metal oxide-$SO_2$ reduction can also be applied to a methane-methanol cycle for the generation of hydrogen from water as described in the copending application of Robert M. Dreyfuss and Robert G. Hickman for "Methane-Methanol Cycle for the Thermochemical Production of Hydrogen", Ser. No. 590,748 filed concurrently herewith. This cycle can be represented by the following sequence of reactions wherein M is a suitable metal:

$$\begin{aligned}
CH_4 + H_2O &\rightarrow CO + 3H_2 & (20)\\
CO + 2H_2 &\rightarrow CH_3OH & (21)\\
CH_3OH + SO_2 + MO &\rightarrow MSO_4 + CH_4 & (22)\\
MSO_4 &\rightarrow MO + SO_2 + 1/2O_2 & (23)
\end{aligned}$$

$$\overline{H_2O \rightarrow H_2 + 1/2O_2}$$

Closed process cycles, such as those of the present invention, are decidedly advantageous from an economic and environmental standpoint; by-products of the reaction are recycled for reuse so that raw materials are not wasted, and no waste materials are produced to pollute the environment. Other advantages of the present closed cycle process include low operational temperatures (below about 1000 K) and avoidance of corrosive substances.

Although the invention has been described in detail with respect to specific examples, it will be appreciated that various changes and modifications can be made by those skilled in the art within the scope of the invention as expressed in the following claims.

What I claim is:

1. A thermochemical process cycle for the production of hydrogen from water comprising the steps of:
   a. reacting a metal oxide with a metalloid from one of groups V and VI of the periodic system and with sulfur dioxide, thereby producing the corresponding metal sulfate and an intermetallic compound of the corresponding metal and the metalloid,
   b. hydrolyzing the intermetallic compound with sulfuric acid, thereby producing the corresponding metal sulfate and a compound of hydrogen and the metalloid,
   c. thermally decomposing the compound of hydrogen and the metalloid, thereby producing hydrogen and regenerating the metalloid,
   d. thermally decomposing the product metal sulfate, thereby producing oxygen and sulfur trioxide and regenerating the metal oxide and sulfur dioxide,
   e. reacting the product sulfur trioxide with water, thereby regenerating sulfuric acid,
   f. recycling the regenerated metalloid, regenerated metal oxide and regenerated sulfur dioxide to step (a), and
   g. recycling the regenerated sulfuric acid to step (b).

2. A process cycle according to claim 1 wherein the metalloid is selected from the arsenic-antimony-bismuth subgroup and the selenium-tellurium subgroup of the periodic system.

3. A process cycle according to claim 1 wherein the metal oxide in an oxide of a metal selected from manganese, cobalt, nickel, iron, zinc and cadmium.

4. A process cycle according to claim 1 wherein the metalloid is selenium.

5. A process cycle according to claim 4 wherein the metal oxide is an oxide of a metal selected from manganese, cobalt, nickel, iron, zinc and cadmium.

6. A process cycle according to claim 5 wherein the metal oxide is zinc oxide.

7. A process cycle according to claim 5 wherein the metal oxide is cadmium oxide.

* * * * *